United States Patent [19]
Mills

[11] Patent Number: 5,632,702
[45] Date of Patent: May 27, 1997

[54] CONTINUOUSLY VARIABLE TRANSMISSION

[75] Inventor: Ned D. Mills, Kennewick, Wash.

[73] Assignee: Speed Control, Inc., Bellevue, Wash.

[21] Appl. No.: 498,189

[22] Filed: Jul. 5, 1995

[51] Int. Cl.[6] ........................................... F16H 3/70
[52] U.S. Cl. ............................. 475/170; 74/117
[58] Field of Search ........................ 475/170, 162, 475/169, 180; 74/117

[56] References Cited

U.S. PATENT DOCUMENTS

| 1,872,636 | 1/1932 | Greening et al. | |
| 4,164,153 | 8/1979 | Moritsch et al. | 74/217 |
| 4,299,581 | 11/1981 | Korosue | 74/117 |
| 4,352,297 | 10/1982 | Nardi | 74/63 |
| 4,660,427 | 4/1987 | Fenton | 74/63 |
| 5,081,877 | 1/1992 | Mercat | 74/116 |
| 5,454,766 | 10/1995 | Mills | 475/170 |
| 5,516,132 | 5/1996 | Simkins | 475/170 |

FOREIGN PATENT DOCUMENTS

393180  4/1924  Germany.

Primary Examiner—Charles A. Marmor
Assistant Examiner—Sherry Lynn Estremsky
Attorney, Agent, or Firm—Wells, St. John, Roberts, Gregory & Matkin P.S.

[57] ABSTRACT

A continuously variable transmission utilizes a variable eccentric assembly arranged about a central transmission axis. A plurality of input and output vanes are operably interconnected to an orbiter and are sequentially engaged by input and output ratchets that circumscribe them. Positive driving connections are provided between the ratchets and vanes by outer toothed pawls yieldably mounted at the outer ends of the respective vanes. A secondary multiplier transmission can be arranged coaxially with the vanes, which are rotatably supported about the central shaft of the transmission.

11 Claims, 7 Drawing Sheets

CONTINUOUSLY VARIABLE TRANSMISSION

TECHNICAL FIELD

This disclosure relates to a continuously variable transmission. The described transmission is specifically designed for use in bicycles.

BACKGROUND OF THE INVENTION

Changeable speed transmissions for bicycles have been proposed and used for many years. These have included various rear wheel hub transmissions, which typically achieved two or three specified speed reductions, as well as derailleur systems, which use the driving chain as a force transmitting element between selectable rear and/or front sprockets.

Both prior systems have readily-identifiable drawbacks. The limited space available within a rear wheel hub of a bicycle places severe limits on the amount of mechanism that can be included within it, and thereby prevents one from designing such a transmission with many speed changes. Derailleurs, while mechanically simple and externally accessible for adjustment and repair, exert side loading forces on driving chains designed for power transmission in a straight line. They also are subject to the frequent need for adjustment due to wear on both the chain and sprockets. The entire derailleur system is exposed to the elements and requires frequent cleaning and lubrication.

The present invention was developed in an effort to provide a continuously variable transmission within the conventional components of a bicycle. It can be located within the rear wheel hub or within the bottom bracket shell of a bicycle frame. In addition, the transmission itself is not limited to bicycle applications, but can be applied to other driving combinations where continuously variable speed changes are desired.

The present invention utilizes pivoting vanes for continuously modifying rotational speed between coaxial driving and driven rotational elements. Prior attempts to design similar transmissions have resulted in detectable speed variations during each revolution of the equipment. The present equipment smooths the speed variations and provides a practical solution to many of the limitations previously encountered.

BRIEF DESCRIPTION OF THE DRAWINGS

A preferred embodiment of the invention is described below with reference to the accompanying drawings, which are briefly described as follows.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

In FIGS. 1–7 the transmission is shown in an embodiment designed specifically for use within a rear wheel hub in a bicycle. It is to be understood that the same transmission, with minor modification, can be designed for usage within the bottom bracket shell of a bicycle The general nature of the continuously variable transmission can best be understood with respect to the presently preferred embodiment, which is detailed in FIGS. 1–7. This form of the transmission has been developed specifically for use in a rear bicycle wheel hub. However, the transmission components can be modified to adapt them to applications other than bicycles.

The basics of the invention include a variable eccentric assembly 11, a plurality of input and output vanes 22, 25, and rotatable input and output ratchets 35, 40.

The input vanes each have an inner end, an outer end and an intermediate section. The input vanes are rotatably supported about a central axis X—X at their respective inner ends for variable rotation about the central axis in relation to one another. The input vanes 22 are pivotally and slidably coupled to the variable eccentric assembly 11 at their respective intermediate sections.

A rotatable input ratchet 35 is concentric with the central axis X—X. It includes a directionally toothed driving ring 36 circumferentially surrounding the input vanes 22. The outer ends of the respective input vanes 22 each have a yieldable tooth selectively engaging the driving ring 36 of input ratchet 35 (see FIG. 4).

An input drive element, shown as a chain-driven sprocket 51, is operably coupled to input ratchet 35 to impart sequential driving engagement between the drive ring 36 of the input ratchet and the outer ends of the sequentially operating input vanes 22.

The transmission further comprises an axially spaced set of output vanes 25. The respective output vanes 25 each also have an inner end, an outer end, and an intermediate section. They are rotatably supported about the central axis X—X at their respective inner ends for variable rotation about the central axis in relation to one another. The output vanes 25 are pivotally and slidably coupled to the variable eccentric assembly 11 at their respective intermediate sections (See FIG. 6).

A rotatable output ratchet 40 is concentric with the central axis X—X. It includes a directionally toothed driven ring 37 circumferentially surrounding the output vanes 25. The toothed rings 36 and 37 of the respective input and output ratchets 35 and 40 have oppositely facing circular patterns of internal teeth formed thereon.

The outer ends of the respective output vanes 25 each have a yieldable tooth selectively engaging the teeth about the driven ring 37. The teeth on the respective output vanes 25 face oppositely to the teeth on the input vanes 22.

An output or driven member is illustrated as a bicycle wheel hub 52. It is operably coupled to output ratchet 40 for rotation about the central axis X—X in response to sequential driving engagement between the outer ends of the output vanes 25 and the driven ring 37 of the output ratchet 40.

More specifically, the bicycle transmission shown in the drawings includes coaxial first and second rotatable members in the form of a drive sprocket 51 and a driven wheel hub 52. They are arranged on the transmission for independent rotation about the central axis X—X of the transmission.

The eccentric assembly 11 includes a cylindrical outer surface 16 formed about an eccentric axis (indicated by the letter "E" in FIGS. 4 and 6) that is parallel and radially adjustable relative to the central axis X—X. Orbiter 20 is rotatably mounted by the cylindrical surface 16 for rotational movement about the variable eccentric axis.

The axially spaced input and output ratchets 35, 40 are coaxially positioned about the central axis X—X at opposite axial ends of the orbiter 20. They include oppositely facing circular patterns of internal teeth formed thereon. Input and output ratchets 35, 40 are each coaxially centered about the central axis X—X.

A plurality of input vanes 22 are located within the toothed ring 36 of input ratchets 35. Each input vane 22 has a first or inner end including a hub 26 coaxially pivoted about the central axis X—X. The four input vanes 22 are identical to one another, but their respective inner hub sections are axially offset from one another and overlap each other to properly arrange the input vanes 22 in a common transverse plane.

A second or outer end of each input vane 22 includes at least one yieldable tooth. It is complementary to and selectively engage the internal teeth about tooth ring 36 of input ratchet 35 during a portion of each complete revolution of the eccentric assembly 11. Each input vane 22 is operably interconnected to orbiter 20 at a location intermediate its first and second ends.

A plurality of similar output vanes are provided at the opposite axial end of orbiter 20. Each output vane 25 has a first or inner end coaxially pivoted about the central axis X—X. The hubs 30 of the output vanes 25 are also offset so as to arrange the output vanes across a common plane in the transmission.

A second or outer end of each output vane 25 includes at least one yieldable tooth. It is complementary to and selectively engage the internal teeth about the toothed ring 37 of output ratchet 40 during a portion of each complete revolution of eccentric assembly 11. Each output vane 25 is operably interconnected to the orbiter 20 at a location intermediate its first and second ends.

Figure 5:
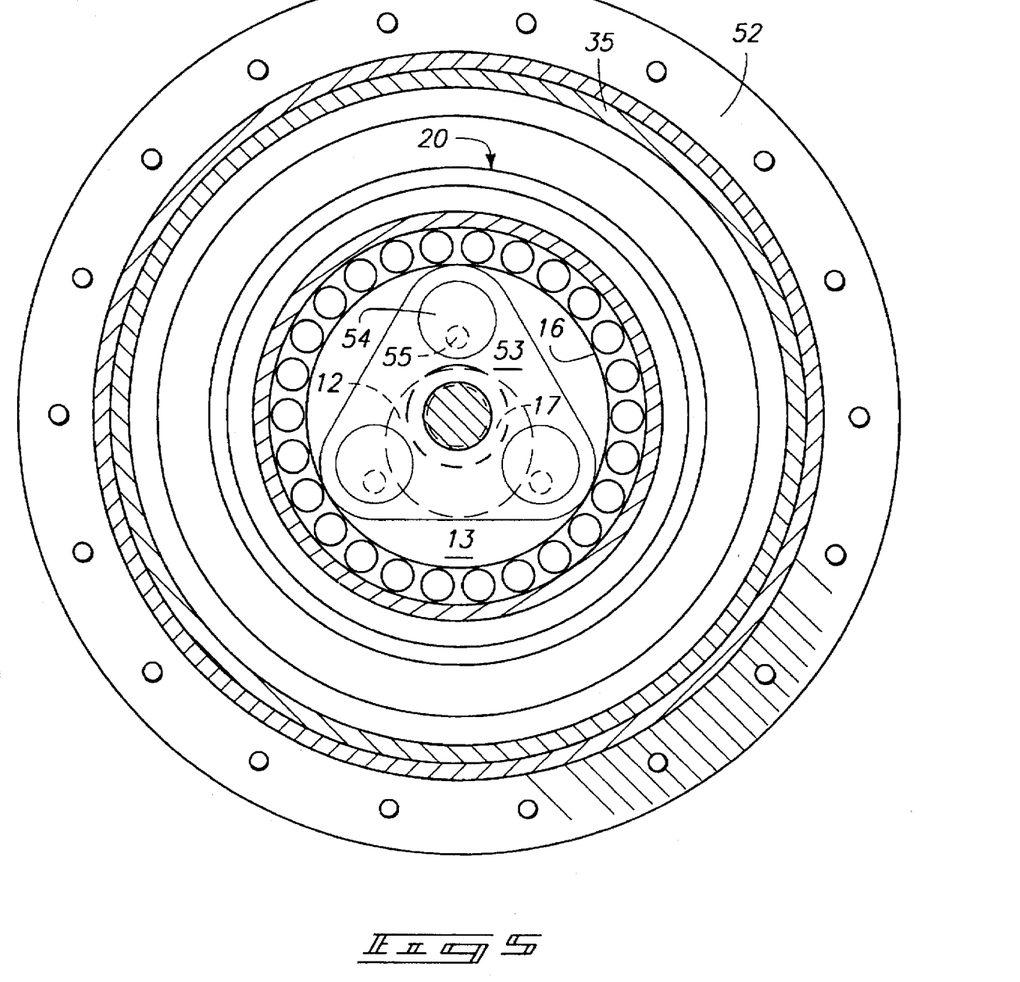
FIG. 5 is a sectional view taken along line 5—5 in FIG. 1.

The illustrated eccentric assembly 11 is a double eccentric including an inner eccentric 12 and an outer eccentric 13 (See FIG. 5). Inner and outer eccentric elements 12, 13 are independently rotatable relative to one another.

The inner eccentric element 12 has an inner cylindrical surface rotatably mounted about the central axis X—X by central shaft 10. It includes an integral tubular extension shaft 17 leading outward at one axial end of the transmission. The outer end of extension shaft 17 mounts a small sprocket 18 or an equivalent gear or other device capable of imparting rotational movement to shaft 17 and inner eccentric 12. The inner eccentric 12 has an outer eccentric cylindrical surface centered about an axis radially offset from central axis X—X.

The outer eccentric element 13 has an inner cylindrical surface rotatably mounted about the eccentric outer cylindrical surface of the inner eccentric member 12. As previously described, it includes an eccentric outer cylindrical surface 16 about which the orbiter 20 is supported.

In the preferred embodiment of the transmission as shown, the outer eccentric element 13 within eccentric assembly 11 is prevented from rotating relative to central shaft 10 with respect to the central axis X—X. However, the outer eccentric 13 is free to be shifted radially with respect to axis X—X as the degree of eccentricity is varied during operation of the transmission.

Figure 1:
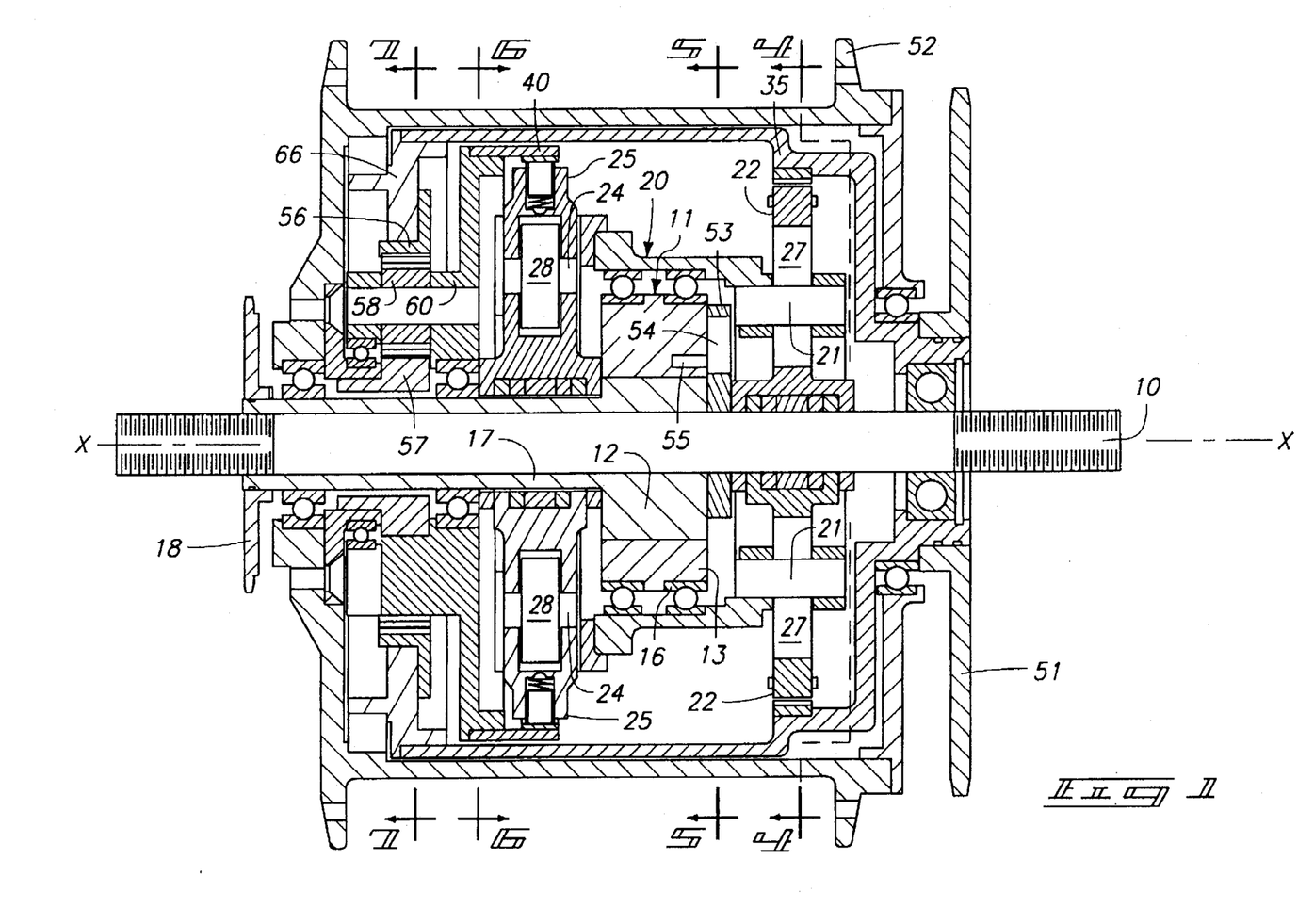
FIG. 1 is a transverse sectional view through the central axis of a bicycle wheel hub containing a first embodiment of the transmission.
Figure 2:
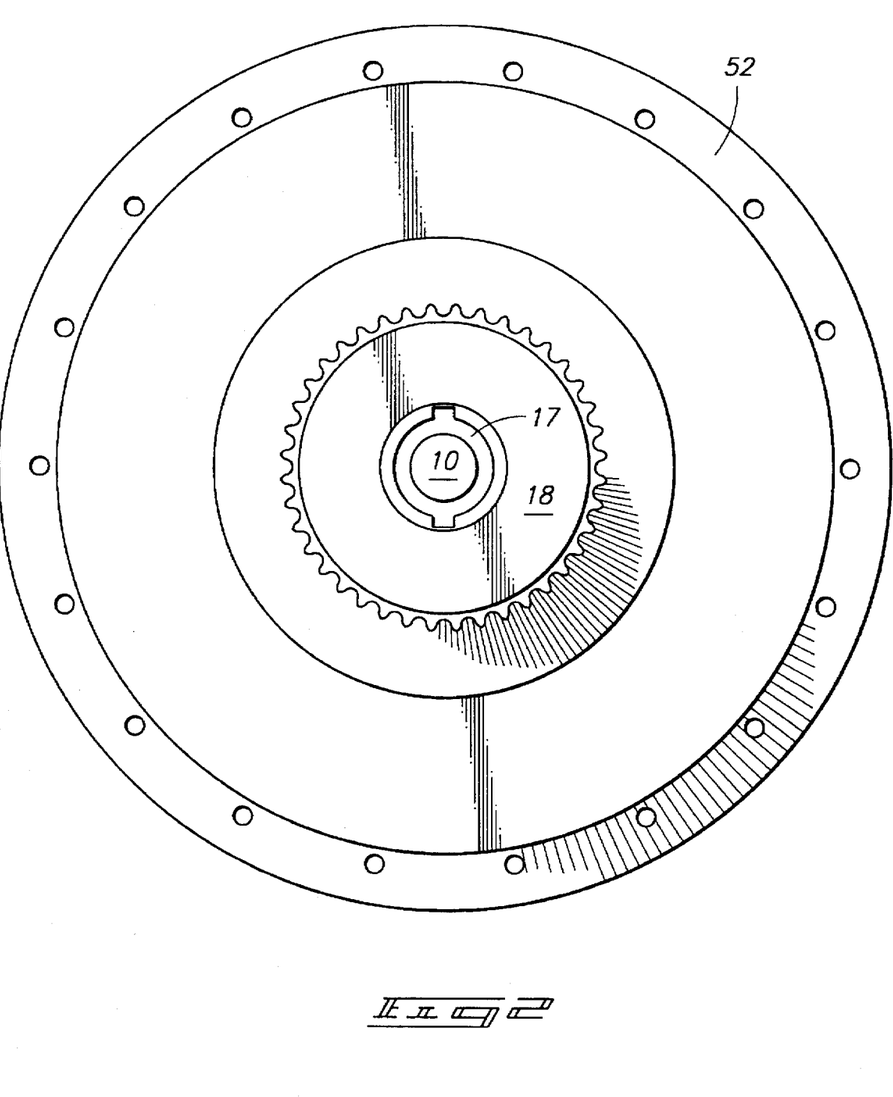
FIG. 2 is a left hand end view.
Figure 3:
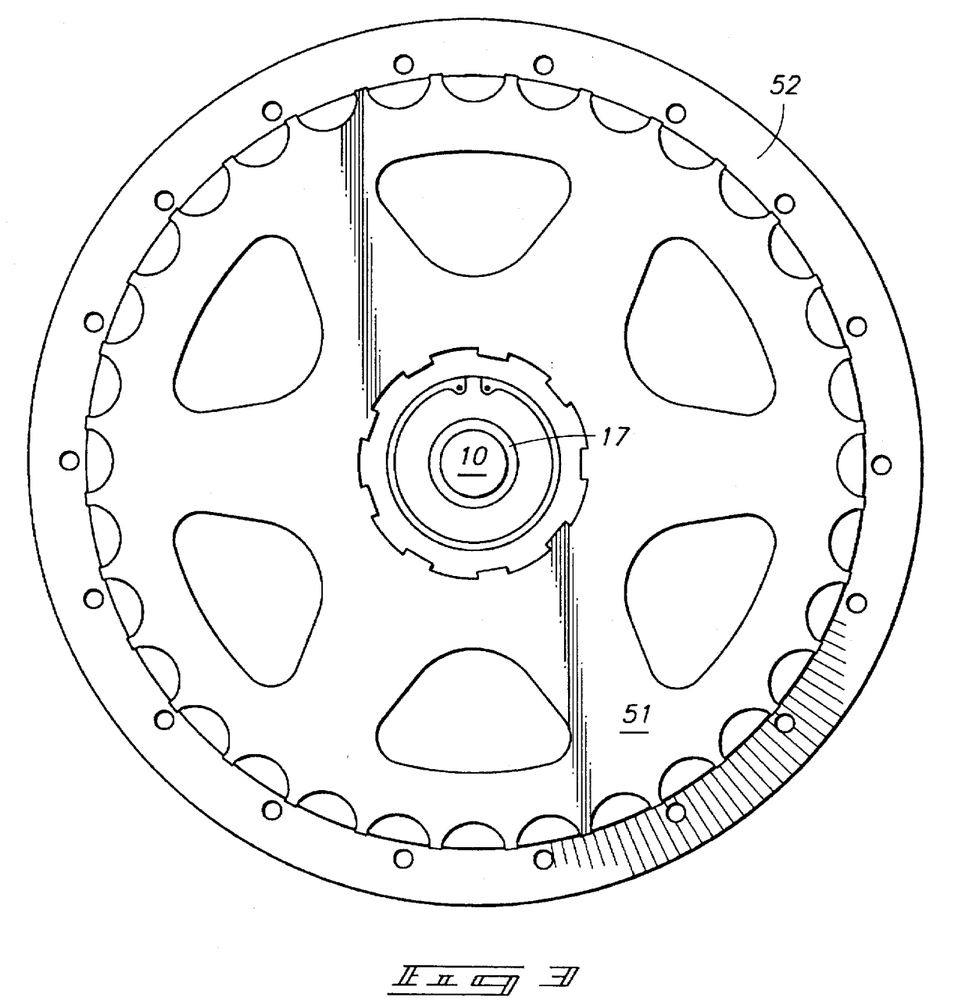
FIG. 3 is a right hand end view.
Figure 4:
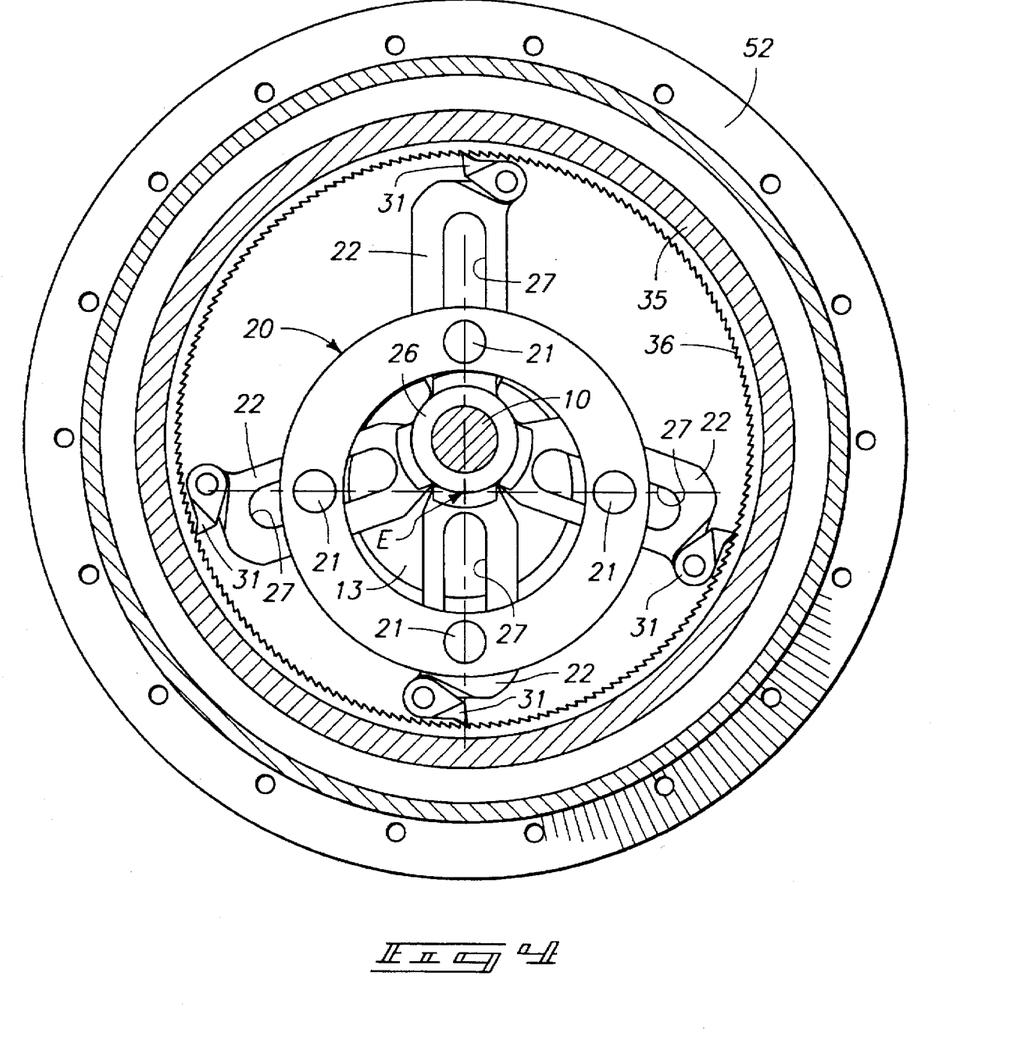
FIG. 4 is a sectional view taken along line 4—4 in FIG. 1.
Figure 6:
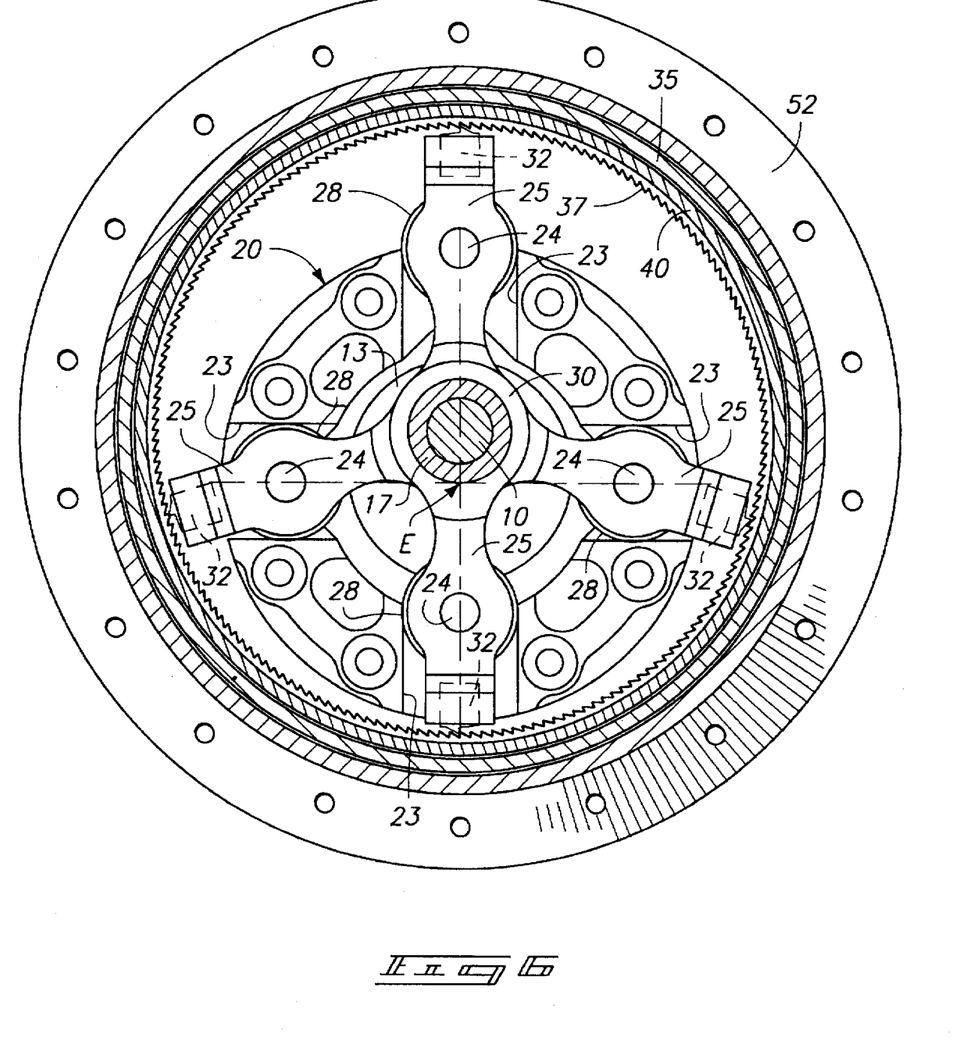
FIG. 6 is a sectional view taken along line 6—6 in FIG. 1.
Figure 7:
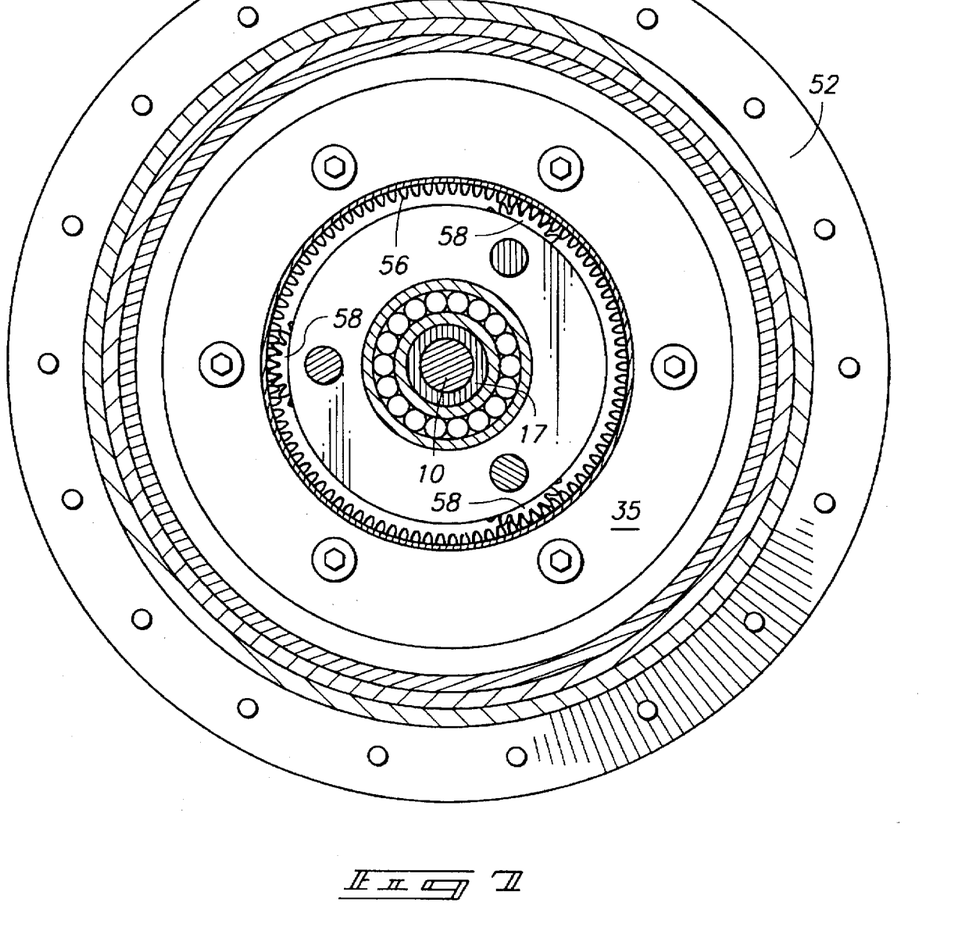
FIG. 7 is a sectional view taken along line 7—7 in FIG. 1.

For illustrative purposes, the transmission is illustrated in FIGS. 1 and 5 with the eccentric outer surface 16 concentric with the central axis X—X. In this position, the transmission is locked-up and has a 1 to 1 gear ratio. In FIGS. 4 and 6, the inner eccentric 12 has been turned 180° relative to the stationary outer eccentric 13 for illustration of the alternative extreme operational positions of the transmission components. In the specific form of the unit as shown, the gear ratio is then 1 to 2.6.

The eccentric assembly 11 is operably connected to the fixed central support shaft 10 which in turn is centered about the central axis X—X. Interconnection is accomplished through a transverse shift triangle 53 located adjacent to one axial end of the eccentric assembly 11 (see FIG. 5). Triangle 53 is fixed to shaft 10. Shaft 10 is normally locked to the supporting wheel frame of a bicycle on which the surrounding wheel hub 52 is mounted.

The eccentric movement imparted to the outer eccentric 13 is accommodated by interconnecting bushings 54 that are rotatably carried on shift triangle 53 for motion about axes parallel to central axis X—X. Each bushing 54 includes an integral projecting pin 55 rotatably received within complementary apertures at the adjacent axial end of outer eccentric 13 (see FIG. 1). Thus, the outer eccentric 13 remains adjustable in a radial direction relative to axis X—X, but is locked rotationally to the central shaft 10.

The illustrated sprocket 18 serves as an adjusting mechanism operably connected to the inner eccentric element 12. In one simple embodiment, the sprocket 18 might have a short length of chain (not shown) partially wrapped about it and connected to a controlling shift cable (not shown) at one or both ends of the chain. By pulling on one or both ends of the chain, the sprocket 18 can be pivoted about the axis X—X to angularly shift the position of inner eccentric element 12 relative to central shaft 10 and outer eccentric element 13.

Because of the working forces exerted on the eccentric assembly 11 during operation of the transmission, the simplified adjusting mechanism described in the previous paragraph requires the application of substantial force if adjustment is attempted while the transmission is operating under load. However, this can be achieved by use of a worm and worm gear adjusting mechanism, which would provide greater torque to the extension shaft 17 and the benefits of an irreversible turning gear system.

While the above-described transmission can be utilized without additional gearing, size constraints encountered in designing the transmission for use on a bicycle have dictated the addition of multiplier gearing at the output of the transmission. In the embodiment disclosed, this is provided by a planetary gear that is more specifically illustrated in FIG. 7.

The planetary transmission is interposed between the hub 52 and output ratchet 40. It includes a ring gear 56 fixed to input ratchet 35 and a sun gear 57 fixed to the hub 52 (see FIG. 1). The ring gear 56 and sun gear 57 are drivingly interconnected by a series of planet gears 58 rotatably supported on a planetary carrier 60.

Planet carrier 60 is rotatable about the central axis X—X and is integrally connected to output ratchet 40. It rotatably supports the planetary gears 58 in meshing engagement with both the ring and sun gears to provide the desired multiplier at the output of the operational transmission.

As previously described, orbiter 20 is freely rotatable about the outer circular surface of the eccentric assembly 11. At one axial end, the orbiter 20 includes four projecting axial pins 21 (see FIGS. 1 and 4) respectively engaged within slots 27 formed through the four input vanes 22. At its opposite axial end, orbiter 20 includes a transverse face (see FIG. 6) including four radial slots 23 each formed by two parallel, inwardly facing axial walls on the orbiter 20. The parallel walls are engaged by individual rollers 28 rotatably carried on the four output vanes 25. The rollers 28 in turn are supported by shafts 24 fixed to and aligned axially on the output veins 25 (see FIGS. 1 and 6).

Both the input and output vanes 22, 25 are mounted concentrically with the axis of shaft 10. Each vane includes a support hub 26, 30 at its inner end. The hubs 26 of the input vanes 22 are rotatably mounted about the shaft 10 (see FIGS. 1 and 4). The respective hubs 26 include axial offsets to locate the four input vanes 22 in a common plane perpendicular to the axis of shaft 10. Similarly, output vanes 25 include hubs 30 at one of their ends. Hubs 30 are mounted about concentric tubular shaft extension 17 that is integral with the inner concentric 12. They also are provided with axial offsets to locate the output vanes 24 in a common plane perpendicular to the axis of shaft 10.

The outer end of each input vane 22 pivotally supports a single tooth pawl 31. The outer end of each output vane 25 slidably supports a single tooth pawl 32. The two illustrated forms of pawls 31 and 32 are functionally identical. They are interchangeable in the design of a specific transmission according to this invention. Pawls 31 and 32 are operationally reversed in position on the input and output vanes 22, 25. They face in opposite directions in the two vane sets. Each pawl 31, 32 is yieldably biased by a spring which urges the transverse tooth across the pawl to a radially extended position.

The vanes 22, 25 are thus pivotally mounted at their inner ends about the axis of shaft 10. Their instantaneous angular positions relative to that axis are controlled by their interconnections to the ends of orbiter 20. These instantaneous angular positions in turn are a function of the eccentricity of the double eccentric 11 about which the orbiter 20 rotates.

The pawls 31 on input vanes 22 are engaged by inwardly directed cylindrical ratchet teeth formed on the toothed ring 36 of input ratchet 35. Output ratchet 40 has oppositely directed ratchet teeth formed on the toothed ring 37 engaged by the pawls 32 on the output vanes 24.

The continuously variable transmission illustrated within FIGS. 1–7 receives input torque through drive sprocket 51 and input ratchet 35, which in turn rotates in unison with ring gear 56 of the multiplier planetary transmission.

Input torque is directly transferred from input ratchet 35 to the angularly movable and rotatable input vanes 22. Each vane 22 will sequentially be drivingly engaged with the toothed ring 36 during 90° of the full rotational cycle of orbiter 20 about its eccentric axis of rotation. The resulting motion of the sequentially-operative vanes 22 is transferred to orbiter 20 through the interconnecting pins 21.

The remaining vanes 22 will lightly drag over the toothed ring 36 and will become radially disengaged from the ratchet teeth as a result of the pivotal forces exerted upon them due to their respective interconnections to the orbiter 20.

The rotational movement imparted to the eccentrically mounted orbiter 20 by input vanes 22 is subsequently transferred to the output vanes 25 through the orbiter slots 23 and engaged rollers 28. Output vanes 25 also sequentially engage the associated toothed ring 37 during 90° of the full rotational cycle of orbiter 20 about its eccentric axis of rotation. The locations at which the operational input and output vanes 22, 25 engage the respective toothed rings 36, 37 are diametrically opposite to one another.

The rotational movement of output ratchet 40 is imparted directly to the planetary carrier 60. The resultant rotational motion of the planetary transmission elements is transmitted to sun gear 57. It is connected directly to wheel hub 52, which serves as the output for this embodiment of the transmission.

The vaned transmission achieves a gear ratio because of the differing radii of engagement between the orbiter 20, the input vanes 22 and the output vanes 25. As shown in the drawings, the axial centers of pins 21 which engage elongated slots 27 within input vanes 22 are closer to axis X—X than are the corresponding centers of shafts 24 which support rollers 28 located within the output vanes 25. The size relationships between these radii should be selected to provide a maximum radius of engagement to the output vanes 25 within the limiting size parameters of the transmission. It is also important to provide the maximum available difference in the effective radii at which the orbiter 20 is interconnected to the two sets of vanes 22 and 25. These relationships have been found to minimize the usual "stutter" or velocity deviations encountered during operation of this type of transmission.

In the illustrated transmission, the input vanes 22 are interconnected to orbiter 20 by pins on the orbiter, while the output vanes 25 are interconnected to orbiter 20 by radial slots bearing against vane rollers 28. These interconnections can be reversed in the design of the respective input and output vanes. In addition, both sets of vanes might be connected to the orbiter by pins, or both might include rollers that are engaged along radial slot walls on the orbiter. The choices of orbiter interconnections will depend upon the encountered loads, spatial limitations, and end use applications for the transmission.

One practical problem encountered when using any vaned transmission where moving vanes sequentially engage surrounding circumferential members is the tendency of such transmission to "stutter" or encounter noticeable velocity deviations as individual vanes are engaged or disengaged. This can be further minimized by properly relating the angular positions of the input and output vanes 22, 25 on the orbiter 20, in addition to the vane and orbiter design considerations previously discussed.

In the illustrated transmission, it is preferable that the four input vanes 22 be offset by an angle of 45° with respect to the corresponding four output vanes 25. However, if an odd number of vanes is used in the sets of input and output vanes, they should be in alignment with one another at the respective ends of orbiter 20.

It will be apparent that the illustrated transmission can readily be reconfigured for usage within the bottom bracket shell of bicycle. The powered input would then be a concentric central shaft serving as the bicycle crankshaft. It could be surrounded by a tubular shaft locked to the bicycle frame and fixed to the shift triangle holding the outer eccentric in a stationary angular position. The input ratchet would then be operatively fixed to the crankshaft and rotate in unison with it.

The rotating output member of this alternative form of the invention could be a conventional driving chain sprocket, but might alternatively be in the form of a pulley, crank or any desired rotating output element. It can be fixed to rotate in unison with the sun gear in the planetary cluster previously described.

The components of the transmission would remain functionally identical to those described with respect to the illustrated embodiment of the invention. Their axial positions along axis X—X might be reversed to locate the output sprocket at the same side of the illustrated transmission as is the drive sprocket 51 in FIG. 1.

While the illustrated transmission is located entirely within one housing, it is to be understood that the transmission components (the planetary transmission and continuously variable transmission) could be separately located on rotationally interconnected shafts, such as the driven wheel hub and crank shaft of a bicycle. As an example, the vaned transmission might be incorporated within the bottom bracket shell of a bicycle and the associated transmission multiplier might be incorporated within the associated driven wheel hub.

It is to be understood that a second stage planetary transmission, while desirable, is not a necessary feature of the basic transmission. It does provide an extended gear ratio range, particularly within the size limitations encountered in bicycle applications. It also lends itself to design of a compact two-speed output for the basic transmission structure. However, the basic vane transmission could be utilized in conjunction with a different type of single speed or multispeed transmission.

The illustrated form of the planetary transmission can be modified to provide for a two-stage output transmission. This would require that the supporting casing 66 for ring gear 56 be axially movable along axis X—X. The ring gear might then be alternately coupled to the input ratchet 35 (as shown) or to a fixed frame member (not shown) to modify operation of the multiplying planetary transmission as desired during operation of the transmission. This two stage operation, when synchronized with operation of the vaned transmission, can double its gear ratio and effectively extend it throughout the normal full range of ratios expected within a bicycle environment.

As an example, if casing 66 were to be shifted to the right in FIG. 1, it might lock up and rotate in unison with the input ratchet 35 in the manner generally described with respect to the illustrated embodiment. However, if casing 66 were to be shifted to the left to assume a disengaged position relative to the input ratchet 35, the ring gear 56 would then be held stationary by engagement of an adjacent frame member (not shown). Thus, slight axial movement of casing 66 might provide two different speed ratios in the second stage planetary transmission included within the one transmission housing. Various forms of couplings, clutches, brakes and other control mechanisms can be utilized to achieve this expanded range of operation.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A continuously variable transmission, comprising:

a variable eccentric assembly arranged about a central axis;

a plurality of input vanes, the respective input vanes each having an inner end, an outer end, and an intermediate section, the input vanes being rotatably supported about the central axis at their respective inner ends for variable rotation about the central axis in relation to one another, the input vanes further being pivotally and slidably coupled to the variable eccentric assembly at their respective intermediate sections;

a rotatable input ratchet concentric with the central axis and including a directionally toothed driving ring circumferentially surrounding the input vanes, the outer ends of the respective input vanes each having a yieldable tooth selectively engaging the driving ring; and an input drive element operably coupled to the input ratchet to impart sequential driving engagement between the driving ring of the input ratchet and the outer ends of the input vanes.

2. The continuously variable transmission of claim 1, further comprising:

a plurality of output vanes, the respective output vanes each having an inner end, an outer end, and an intermediate section, the output vanes being rotatably supported about the central axis at their respective inner ends for variable rotation about the central axis in relation to one another, the output vanes further being pivotally and slidably coupled to the variable eccentric assembly at their respective intermediate sections;

a rotatable output ratchet concentric with the central axis and including a directionally toothed driven ring circumferentially surrounding the output vanes, the outer ends of the respective output vanes each having a yieldable tooth selectively engaging the driven ring; and an output driven element operably coupled to the output ratchet for rotation about the central axis in response to sequential driving engagement between the outer ends of the output vanes and the driven ring of the output ratchet.

3. A continuously variable transmission, comprising:

coaxial first and second rotatable members for independent rotation about a central axis;

an eccentric assembly having a cylindrical surface formed about an eccentric axis parallel and radially adjustable relative to the central axis;

an orbiter rotatably mounted by the cylindrical surface of the eccentric assembly for rotational movement about the eccentric axis;

axially spaced input and output ratchets coaxially positioned about the central axis, the input and output ratchets having oppositely facing circular patterns of internal teeth formed thereon and centered about the central axis;

a plurality of input vanes, the input vanes each having a first end coaxially pivoted about the central axis and a second end including at least one yieldable tooth complementary to and selectively engaging the internal teeth of the input ratchet during a portion of each complete revolution of the eccentric assembly, each input vane being operably interconnected to the orbiter at a location intermediate its first and second ends; and a plurality of output vanes, the output vanes each having a first end coaxially pivoted about the central axis and a second end including at least one yieldable tooth complementary to and selectively engaging the internal teeth of the output ratchet during a portion of each complete revolution of the eccentric assembly, each output vane being operably interconnected to the orbiter at a location intermediate its first and second ends.

4. The continuously variable transmission of claim 3, wherein the eccentric assembly is operably connected to a fixed central support shaft centered about the central axis.

5. The continuously variable transmission of claim 3, wherein the eccentric assembly comprises:

inner and outer eccentric elements independently rotatable relative to one another, the inner eccentric element having an inner cylindrical surface rotatably mounted about the central axis and an eccentric outer cylindrical surface, the outer eccentric element having an inner cylindrical surface rotatably mounted about the eccentric outer cylindrical surface of the inner eccentric member and an eccentric outer cylindrical surface.

6. The continuously variable transmission of claim 3, wherein the eccentric assembly comprises:

inner and outer eccentric elements independently rotatable relative to one another, the inner eccentric element having an inner cylindrical surface rotatably mounted about the central axis and an eccentric outer cylindrical surface, the outer eccentric element having an inner cylindrical surface rotatably mounted about the eccentric outer cylindrical surface of the inner eccentric member and an eccentric outer cylindrical surface; and a fixed supporting shaft centered along the central axis and operably connected to the outer eccentric element to prevent the outer eccentric element from rotating relative to the supporting shaft with respect to the central axis.

7. The continuously variable transmission of claim 3, wherein the eccentric assembly comprises:

inner and outer eccentric elements independently rotatable relative to one another, the inner eccentric element having an inner cylindrical surface rotatably mounted about the central axis and an eccentric outer cylindrical surface, the outer eccentric element having an inner cylindrical surface rotatably mounted about the eccentric outer cylindrical surface of the inner eccentric member and an eccentric outer cylindrical surface; and an adjusting mechanism operably connected to the inner eccentric element.

8. The continuously variable transmission of claim 3, further comprising:

a ring gear mounted for rotation in unison with the first rotatable member and centered about the central axis;

a sun gear formed on the second rotatable member and centered about the central axis; and a planet carrier rotatable about the central axis and operably connected to the output ratchet, the planet carrier rotatably supporting a plurality of planetary gears in meshing engagement with both the ring and sun gears.

9. The continuously variable transmission of claim 3, wherein the components listed within claim 3 are supported about a mounting shaft centered about the central axis;

the mounting shaft being fixed to a frame member in a bicycle;

the first rotatable member being an input sprocket operably connected to the input ratchet; and the second rotatable member being a bicycle wheel hub operably connected to the output ratchet.

10. The continuously variable transmission of claim 3, wherein the effective radius at which the orbiter is interconnected to the output vanes is to be selected to provide a maximum radius of engagement to the output vanes within the limiting size parameters of the transmission.

11. The continuously variable transmission of claim 3, wherein the orbiter and vanes are sized to provide the maximum available difference in the effective radii at which the orbiter is interconnected to the two sets of vanes.

* * * * *